United States Patent
Tomihashi et al.

[11] Patent Number: 5,879,746
[45] Date of Patent: Mar. 9, 1999

[54] AQUEOUS DISPERSION COMPOSITIONS OF FLUORINE-CONTAINING MELT-PROCESSABLE RESINS

[75] Inventors: Nobuyuki Tomihashi; Toshio Mizuno; Toshio Miyatani; Takuya Yasumoto, all of Settsu, Japan

[73] Assignee: Daikin Industries, Ltd., Osaka, Japan

[21] Appl. No.: 914,108

[22] Filed: Aug. 19, 1997

Related U.S. Application Data

[63] Continuation of Ser. No. 616,781, Mar. 15, 1996, abandoned, which is a continuation of Ser. No. 211,943, filed as PCT/JP93/01149, Aug. 16, 1993, published as WO94/05729, Mar. 17, 1994, 1994, abandoned.

[30] Foreign Application Priority Data

Aug. 28, 1992 [JP] Japan ..................... 4--230394

[51] Int. Cl.$^6$ ...................................... B05D 3/02
[52] U.S. Cl. .................. 427/379; 524/375; 524/378; 524/379; 524/388; 524/545
[58] Field of Search ................. 524/545, 375, 524/378, 379, 388; 427/379

[56] References Cited

U.S. PATENT DOCUMENTS

| | | | |
|---|---|---|---|
| 4,276,214 | 6/1981 | Yoshimura et al. | 260/45.75 |
| 4,914,158 | 4/1990 | Yoshimura et al. | 525/199 |

FOREIGN PATENT DOCUMENTS

| | | |
|---|---|---|
| 57-15607 | 1/1982 | Japan . |
| 64-25506 | 1/1989 | Japan . |
| 1-228377 | 12/1989 | Japan . |

OTHER PUBLICATIONS

International Search Report.

*Primary Examiner*—Peter D. Mulcahy
*Attorney, Agent, or Firm*—Varndell Legal Group

[57] ABSTRACT

An aqueous dispersion composition comprising a fluorine-containing melt-processable resin powder having an average particle size of 10 to 1000 $\mu$m, a water-soluble solvent, a surfactant and water, and said fluorine-containing melt-processable resin powder being contained in an amount of 15 to 80 % by weight. Without generating cracks and pin holes, a thickness of coating film per one application can be increased more than 1 mm, and a total thickness can further be made thicker.

7 Claims, No Drawings

AQUEOUS DISPERSION COMPOSITIONS OF FLUORINE-CONTAINING MELT-PROCESSABLE RESINS

CROSS-REFERENCE TO RELATED APPLICATIONS

This application is a continuation application of U.S. Ser. No. 08/616,781 filed Mar. 15, 1996, now abandoned, which is a continuation of U.S. Ser. No. 08/211,943 filed Jun. 22, 1994, now abandoned, which is a U.S. national phase application based on International Application No. PCT/JP93/01149, filed Aug. 16, 1993, published as WO94/05729, Mar. 17, 1994.

TECHNICAL FIELD

The present invention relates to aqueous dispersion composition of fluorine-containing melt-processable resins, particularly relates to aqueous dispersion compositions which can increase a thickness of coating per one application and also can provide coatings without crack. The compositions are especially useful as aqueous dispersion paints.

BACKGROUND ARTS

Fluorine-containing melt-processable resins such as tetrafluoroethylene-perfluoroalkyl vinyl ether are excellent in chemical resistance, weatherability, heat resistance, non-stickiness and the like, and further are melt-processable. Therefore, the resins are used for enhancing functions such as corrosion resistance, non-stickiness and low abrasion by coating, for example, heat resistance substrates such as iron, aluminium and stainless steel.

Conventionally, as for such a use, there are paints of organic solvent type prepared by dissolving fluorine-containing melt-processable resins in organic solvents, and aqueous dispersion paints prepared by dispersing fluorine-containing melt-processable resins in water (JP-B-10896/1982).

The aqueous dispersion compositions are safe and easy to handle, and coatings thereof are formed by applying onto a primer layer of a substrate with brushing or air spraying, and then drying and sintering.

Since resin particles in the conventional aqueous dispersion paints are small in size, however, when increasing a thickness of one application, cracks occur on the resulting coating. Therefore, a coating obtainable by one application has a thickness of at most 50 $\mu$m. In order to make the coating thicker even if the number of applications increases, cracks also occur when the thickness is large. Accordingly, a thickness of the coating prepared by recoating method cannot be beyond 1 mm.

Aqueous dispersion paints containing binders disclosed in JP-A-10896/1982 cannot be used in recoating method.

An object of the present invention is to provide aqueous dispersion compositions of fluorine-containing melt-processable resins which can increase a thickness of coating per one application and can give thicker coatings having no crack.

DISCLOSURE OF THE INVENTION

The present invention relates to aqueous dispersion compositions comprising fluorine-containing melt-processable resin powders having an average particle size of 10 to 1000 $\mu$m, water-soluble solvents, surfactants and water; said fluorine-containing melt-processable resin powders being contained in an amount of 15 to 80% by weight.

PREFERRED EMBODIMENTS FOR THE INVENTION

The fluorine-containing melt-processable resins used in the aqueous dispersion compositions of the present invention preferably have a melting point of 150° to 350° C. and a melt viscosity of not more than $10^7$ poises at a temperature higher than the melting point by 50° C. Examples are, for instance, copolymer of tetrafluoroethylene such as tetrafluoroethylene-perfluoroalkyl vinyl ether copolymer (PFA), tetrafluoroethylene-perfluoroalkyl vinyl ether-hexafluoropropylene copolymer (EPA), tetrafluoroethylene-ethylene copolymer (ETFE), tetrafluoroethylene-hexafluoropropylene copolymer (FEP); clorotrifluoroethylene polymers such as polyclorotrifluoroethylene (PCTFE) and clorotrifluoroethylene-ethylene copolymer (ECTFE); poly(vinylidene fluoride) (PVdF), vinylidene fluoride copolymers, and one or more of fluorine-containing melt-processable resins thereof. Those may be used alone or in admixture. Those fluorine-containing melt-processable resins are blended in the form of powder having an average particle size of 10 to 1000 $\mu$m, preferably 30 to 300 $\mu$m. When the average particle size is too small, cracks may occur on sintering and the recoating method cannot be adopted, and when too large the dispersion is not stable due to precipitation, and thus cannot be applied. The powders preferably have an apparent density of 0.3 to 1.5 g/cc, particularly 0.5 to 1.0 g/cc. When the apparent density is low, dispersing property is bad, foaming may occur, and leveling property is easy to become bad. When too high, the powders are easy to precipitate, which makes dispersing property bad.

Amount of the fluorine-containing melt-processable resin powders is 15 to 80% by weight, preferably 25 to 75% by weight, most preferably 30 to 70% by weight of the total weight of the composition. When the amount is small, a viscosity of the dispersion is so low that the coated dispersion may drip instantly when coating on a substrate, and a thicker coating cannot be obtained. On the other hand, when too large, the composition does not have flowing property and thus cannot be applied. Concrete amount may be optionally determined within the above range by considering application method and controlling of coating thickness. In case of spray coating and the like, a concentration is relatively low, and in case of putty coating and the like, there is employed in the form of paste, i.e. a concentration of not less than 50% by weight.

The water-soluble solvents have a role of wetting the fluorine-containing melt-processable resins. The water-soluble solvents having a higher boiling point act as drying time retarders which prevent occurrence of crack by binding the resins with each other on the drying after the application. In such a case, since the solvents can be evaporated on the sintering, the coating is not affected. Examples are, for instance, organic solvents having a low boiling point of up to 100° C. such as methanol, ethanol, isopropanol, sec-butanol, t-butanol, acetone, methyl ethyl ketone; organic solvents having a middle boiling point of 100° to 150° C. such as toluene, xylene, methyl Cellosolve, methyl isobutyl ketone and n-butanol; organic solvents having a high boiling point of not less than 150° C. such as N-methyl-2-pyrrolidone, N,N-dimethylacetamide, N,N-dimethyformamide, ketocine, ethylene glycol, propylene glycol, glycerine, dimethylcarbitol, butyldicarbitol, butyl Cellosolve, cyclohexanol, diisobutyl ketone, 1,4-butane-diol, triethylene glycol and tetraethylene glycol. As the organic solvents having a high boiling point, the alcohol solvents are preferred in views of wetting of the fluorine-containing melt-processable resin and of safety. Amount of the organic solvents having a low boiling point is 0.5 to 50% by weight, preferably 1 to 30% by weight of the total amount of water. When too small, foaming tends to occur and, when too large, the aqueous dispersion composition becomes inflammable to lose its merit. Amount of the organic solvents having a middle boiling point is 0.5 to 50% by weight, preferably 1 to 30% by weight of the total amount of water. When too large, the solvents may remain in the coating after sintering and, affect the coating. When too small, the sintering cannot be carried out because the solvents return to powders during the drying after application. Amount of the organic solvents having a high boiling point is 0.5 to 50% by weight, preferably 1 to 30% by weight of the total amount of water. When too large, the solvents may remain in the coating after sintering, and affect the coating film.

The surfactants may be agents which can uniformly disperse the fluorine-containing melt-processable resin powders into water in an amount of 15 to 80% by weight. There may be used each of anionic surfactants, cationic surfactants, nonionic surfactants and ampholytic surfactants. Examples are, for instance, anionic surfactants such as sodium alkylsulfate, sodium alkyl ether sulfate, triethanolamine alkyl sulfate, triethanolamine alkyl ether sulfate, ammonium alkyl sulfate, ammonium alkyl ether sulfate, sodium alkyl sulfate, sodium alkyl ether phosphate and sodium fluoroalkyl carboxylate; cationic surfactants such as alkyl ammonium salt and alkylbenzyl ammonium salt; nonionic surfactants such as polyoxyethylene alkyl ether, polyoxyethylene phenol ether, polyoxyethylene alkyl ester, propylene glycol-propyleneoxide copolymer, perfluoroalkyl ethyleneoxide adduct and 2-ethylhexanol ethyleneoxide adduct; ampholytic surfactants such as alkylaminoacetic betain, alkylamidacetic betain and imidazolinium betain. Particularly, anionic and nonionic surfactants are preferable. Most preferable surfactants are nonionic surfactants having an oxyethylene chain.

Amount of the surfactants is generally 0.01 to 10% by weight of the fluorine-containing melt-processable resin powders, preferably 0.1 to 5% by weight, most preferably 0.2 to 2% by weight. When the amount is too small, the powders are not uniformly dispersed and thus a part of powders may float. On the other hand, when too large, amount of decomposed residues of the surfactants by sintering are large to color the coating, and further corrosion resistance and non-stickiness of the coating film become lowered.

The compositions of the present invention can be obtained by uniformly dispersing the fluorine-containing melt-processable resin powders into water, preferably pure water with the water-soluble solvents and the surfactants.

With the compositions of the present invention various additives may be blended according to the desired uses. As the additives there may be employed, for example, fillers, stabilizers, pigments, thickeners, decomposition accelerators, rust inhibitors, defoaming gents, water-soluble organic solvents, and the like.

The compositions of the invention preferably do not contain binders. If the binders are contained, interface adhesive failure is easily taken place, and the recoating method cannot be adapted, and thus a thicker coating cannot be obtained.

The fillers are blended for preventing shrinkage of the resins, improving adhesion strength, enhancing surface hardness and mechanical strength, and further endowing abrasion resistance, impact resistance, high temperature resistance or electric conductivity. Amount of the fillers is 0 to 50 parts (parts by weight, hereinafter the same) per 100 parts of the fluorine-containing melt-processable resin powders, preferably 5 to 30 parts. When too large, the characteristic properties of fluorine resins are lowered. Examples are, for instance, fibrous fillers such as carbon fibers and glass fibers; powder fillers such as carbon powders, pottasium titanate powders, molybdenum disulfide powders, graphite powders, boron nitride powders and glass powders. Preferred fibrous fillers have a length of not more than 1000 $\mu$m and a diameter of 0.5 to 50 $\mu$m, and preferred powder fillers have an average particle size of not more than 70 $\mu$m.

The stabilizers are added to prevent resin components of the resin or the coating film from deteriorating by heat and light, particularly to prevent the fluorine-containing melt-processable resin from thermal decomposition at sintering. Amount of the stabilizers is 0 to 5 parts per 100 parts of the fluorine-containing melt-processable resin powders, preferably 0.5 to 2.5 parts. When too large, the characteristic properties of fluorine resins are lowered. Examples are, for instance, metal powders of the VIII group of the periodic table having an average particle size of not more than 250 $\mu$m, preferably not more than 70 $\mu$m, such as zinc, tin, cobalt, nickel and iron; organic sulphur compounds such as mercaptan compounds of benzoimidazols or their salts, mercaptan compounds of benzothiazols or their salts, dithiocarbamic acid or its salts, thiuram type compounds or their salts and organic mercaptide compounds or their salts, or organic sulphur polymer compounds such as polyphenylene sulfide; phosphites; amine antioxidants such as dinaphthylamine, phenyl-$\alpha$-naphthylamine, phenyl-$\beta$-naphthylamine, diphenyl-p-phenylenediamine, di-$\beta$-naphthyl-p-phenylenediamine, phenylcyclohexyl-p-phenylenediamine, aldol-$\alpha$-naphthyl-diphenylamine and their derivatives; carbon black powders; epoxy compounds; and the like (refer to JP-B-50067/1980, JP-B-34222/1981).

As the pigments, there may be employed metal oxides such as titanium oxide, zinc oxide, zirconium oxide, cadmium oxide and lead oxide; silica, zinc sulfate, lithopone (blend of barium sulfate and zinc sulfide), carbon black, zinc chromate, and the like, The pigments are blended in an amount of 0 to 30 parts per 100 parts of the fluorine-containing melt-processable resin powders, preferably 0.5 to 15 parts.

The thickeners are blended for improving leveling property and processability by increasing the viscosity, when applying as paints. Amount of the thickeners is 0 to 3% by weight of total amount of water, preferably 0.01 to 1% by weight. When too large, the characteristic properties of fluorine resins are lowered, and also coloring and crack occurs in the coating film. Examples are, for instance, methyl cellulose, carboxylvinyl polymer, silica anhydride, organocomplex of aluminium silicate, swellable layered kaolin compound, and the like.

The decomposition accelerators are blended for accelerating the decomposition of the surfactants at sintering not to remain in the coating film. Examples are, for instance, water-soluble salts of silver, nickel, aluminium, gallium and the like (e.g. nickel acetate, nickel nitrate. Refer to JP-A-222439/1990), ammonium nitrate, and the like. Amount of the accelerators varies with kind of the accelerators, and for instance, when using nickel acetate, is 0 to 0.1% by weight (nickel content) of the surfactants, preferably 0.005 to 0.05% by weight. When too large, the characteristic properties of fluorine resins are lowered.

The rust inhibitors are blended for inhibiting generation of rust on a substrate such as iron. Amount of the inhibitors is 0 to 3 % by weight of the total amount of water, preferably 0.01 to 1% by weight. Examples are, for instance, poly (oxyethylene alkylamine), primary alkylamine, secondary alkylamine, and the like.

As the defoaming agents, there may be employed silicone oils, fatty acid amides, metal soaps, hydrophobic silica and the like. Amount of the agents is 0 to 3% by weight of the total amount of water, preferably 0.01 to 1% by weight.

The aqueous dispersion compositions of the present invention may be obtained by completely dissolving the water-soluble solvents and the surfactants in water, and the fluorine-containing melt-processable resin powder is added gradually to the aqueous solution with stirring to be uniformly dispersed. Alternatively, a high concentration solution of the water-soluble solvents and the surfactants may be kneaded with the fluorine-containing melt-processable resin powders with a kneader, and then the mixture is dispersed in water.

It is preferred that the fibers, stabilizers and pigments are previously mixed with the fluorine-containing melt-processable resin powders with a Henschel mixer or the like. The water-soluble solvents, thickeners, decomposition accelerators, rust inhibitors and defoaming agents are added to the aqueous solution of the surfactants and uniformly admixed, and then thereto are added and dispersed the above-mentioned fluorine-containing melt-processable resin mixed powders.

Further, the compositions may be prepared by separately preparing the water-soluble solvents, the aqueous solution of the surfactants, the decomposition accelerators, the rust inhibitors and the defoaming agents and admixing them.

The mixing may be carried out with, for instance, a propeller type mixer, a turbine type mixer and the like. In case of preparing paste with a high-concentration, there may be employed a kneading machine such as a kneader, and a high-torque type-mixer such as a Turbodisper.

The compositions of the present invention are useful as aqueous paints for thick layer coatings and the like. The aqueous paints can be used, by varying a concentration of the fluorine-containing melt-processable resin powders, for spraying, dipping, casting, putty coating (brush, roller, knife and the like), and further for electrodeposition coating.

For example, when the aqueous paints is used for coating a substrate, a primer coating for fluorine resins may be formed, to secure adhesive property on the substrate (metals, ceramics, and the like) to be coated by usual methods, and the composition of the present invention may be applied thereon, then the coating may be dried and sintered. In order to increase a thickness of the coating by the recoating method, the coated layer may be dried and sintered per one application, or may only be dried after each application, and then finally sintered as a whole. As the application methods, there may be employed putty coating such as brush coating, roller coating or knife coating; dip coating; cast coating; spray coating such as airless spray or air spray; electrodeposition; and the like.

Though a thickness of coating film (after sintering) per one application is at most 50 μm in case of the conventional aqueous paints, according to the present invention, the aqueous dispersion compositions can provide a thickness up to about 1200 μm, varying with kind, particle size or concentration of the fluorine-containing melt-processable resin, or the fillers and application method. However, depending on the object and use, a thickness per one application can be optionally selected, and also total thickness can be up to about 5000 μm by the recoating method.

As the drying method there may be employed usual methods such as IR lamp heating and natural drying. The sintering may be carried out in an electric oven at a sintering temperature of the used fluorine-containing melt-processable resin (from melting point to melting point +50° C.).

The obtained coating film does not crack, even if a thickness per one application is thick, and is a homogeneous corrosion resistive coating film.

According to the aqueous dispersion composition of the present invention, working such as painting can be done in a safety environment, because it is aqueous. When increasing a concentration of solid content, the composition becomes pasty. Therefore, the pasty composition can be easily applied by the putty coating (brushing, roll coating, knife coating), and can provide a coating film having a thickness of about 1200 μm per one application.

Namely, according to the present invention, since a thickness per one application can be increased, the desired thickness can be obtained by considerably reduced application times in comparison with the conventional methods, and thermal degradation of the coated film can be inhibited. When a solid content is lowered, the composition can be easily applied by a usual air spraying method, whereby the controlling of thickness is easy, and pin holes in the coated film can be easily covered. Further, both of the putty coating and the spray coating can be done at normal temperature.

The aqueous dispersion composition of the present invention is useful as anticorrosive linings and non-stickiness coatings, and also for enhancing corrosion resistance and non-stickiness of heat resistive substrates such as iron, aluminium and stainless steel. For example, by coating inside walls of tank or pipe, the substrates can be protected from corrosion by chemicals.

In addition, by coating molding dies made of resins or rubbers, or rolls, hoppers or cooking instruments, the mold-releasing ability and the non-stickiness are endowed.

The aqueous dispersion composition of the present invention is explained by means of Examples, but the present invention is not restricted by the Examples.

EXAMPLE 1

By using a powder of ethylene-tetrafluoroethylene copolymer (ETFE) (apparent density 0.5 g/cc, average particle size 50 μm), 100 parts of the powder was mixed with 1 part of a stabilizer (mixture of 4,4'-bisdiphenylamine/zinc salt of 2-mercaptbenzothiazol/tin powder (not more than 40 μm)=3/3/2 by weight) with a Henschel mixer, and then mixed with glass fibers having a diameter of 10 μm and an average length of 50 μm with the Henschel mixer (ETFE/ glass fibers=5/1 by weight). Separately, 2.8 g of a fluorine surfactant of perfluoro-alkylethyleneoxide adduct, 30 g of ethylene glycol and 2.0 g of 3% aqueous solution of methyl cellulose thickener were added to 110 g of pure water, and stirred for 10 minutes to give a uniform aqueous dispersion. To the aqueous dispersion was added 280 g of the ETFE containing the glass fibers at room temperature, stirred for 15 minutes with a three-one motor, and dispersed uniformly to give the aqueous dispersion composition of the present invention. By using the obtained dispersion composition, an iron plate (SS-41) was coated.

The coating was carried out by degreasing an iron plate (SS-41) of 100×80×1 mm with acetone and sand blasting, and knife coating the plate with the aqueous dispersion composition of the present invention by pushing. After the coating, the coated plate was heated with an IR lamp at 90° C. for 30 munites, sintered in an electric oven at 300° C. for 60 minutes to form a coating film having a thickness of about 1000 μm. Over the film, the same application, drying and sintering were repeated to obtain a flat coating film having a thickness of about 1.5 mm without any pin hole. During the applying procedure, drying and sintering, crack did not occur.

COMPARATIVE EXAMPLE 1

A dry mixture was prepared by mixing same stabilizer-containing ETFE powder as of Example 1 and the glass fibers in a weight ratio of 5/1 with the Henschel mixer. The dry mixture was statically deposited on the same iron plate substrate as of Example 1 by spraying at a voltage of 60 kV under a pressure of 2 kg/cm$^3$G for 5 to 10 seconds with an electrostatic powder coating machine (GX 375 from ONODA-IWATA Kabushiki Kaisha). A flat coating film having a thickness of 150 μm was formed on the iron plate by sintering in the electric oven at 300° C. for 60 minutes in the same manner as Example 1. When the same procedure was repeated to obtain a thickness of more than 1 mm, the 6th times of the recoating procedure gave a coating film having an uneven thickness of 900 μm, and further coating procedure made the coating film drip.

COMPARATIVE EXAMPLE 2

The same stabilizer-containing ETFE powder as of Example 1 was admixed with the glass fibers in a weight ratio of 5/1 with the Henschel mixer. Separately 2.8 g of a fluorine surfactant of perfluoroalkylethyleneoxide adduct and 20 g of a 3% aqueous solution of methyl cellulose thickener were added to 140 g of pure water, and stirred for 10 minutes to give a uniform aqueous dispersion. To the aqueous dispersion was added 280 g of the ETFE containing the glass fibers at room temperature, stirred for 15 minutes with a three-one motor, dispersed uniformly. By using the obtained aqueous dispersion composition, the coating, drying and sintering procedures were conducted under the same conditions as in Example 1. However, the coating composition was dried to be powdered and fallen down from the substrate. Further, the sintered coating film had a lack portion, and the recoating could not be effected.

COMPARATIVE EXAMPLE 3

ETFE (apparent density 0.4 g/cc, average particle size 3 to 7 μm) powder was admixed with the stabilizer in the same manner as in Example 1, and then the powder mixture was admixed with glass fibers having a diameter of 10 μm and an average length of 50 μm with a Henschel mixer (ETFE/glass fibers=5/1 by weight). Separately, 2.8 g of a fluorine surfactant of perfluoroalkylethyleneoxide adduct, 30 g of ethylene glycol and 2. 0 g of 3% aqueous solution of methyl cellulose thickener were added to 110 g of pure water, and stirred for 10 minutes to give a uniform aqueous dispersion. To the aqueous dispersion was added 280 g of the ETFE containing the glass fibers at room temperature, stirred for 15 minutes with a three-one motor, and dispersed uniformly. By using the obtained aqueous dispersion composition, the coating, drying and sintering procedures were conducted under the same conditions as in Example 1. As a result, the coating film having a thickness of 300 μm which was formed by the first application was cracked. Recoating was impossible because many cracks were generated.

EXAMPLE 2

By using a powder of tetrafluoroethylene-perfluoro(alkyl vinyl ether) copolymer (PFA) (apparent density 0.45 g/cc, average particle size 50 μm), 100 parts of the powder was mixed with 2 parts of a stabilizer (mixture of 4,4'-bisdiphenylamine/zinc salt of 2-mercaptbenzothiazol/tin powder (not more than 40 μm)=3/3/2 by weight) with a Henschel mixer. The 450 g of stabilizer-containing PFA was dispersed in a mixture of 50 g of isopropyl alcohol (IPA) and 246 g of ethylene glycol. Separately, 8 g of a fluorine surfactant of perfluoroalkylethyleneoxide adduct was added to 246 g of pure water, and stirred to prepare a uniform aqueous dispersion. This aqueous solution of surfactant was mixed with the PFA dispersion, stirred with a three-one motor for 15 minutes, and the solid was uniformly dispersed to obtain the aqueous dispersion composition of the present invention.

An iron plate (SS-41) of 100×80×1 mm was subjected to degreasing with acetone and sand blasting, and thereon a primer layer was formed by applying a primer (Polyfuron enamel EK 1083GB available from Daikin Industries, Ltd.), drying and sintering. On the primer layer the aqueous dispersion composition was sprayed with a spray gun having a diameter of 1.0 mm. After heating with an IR lamp at 90° C. for 30 minutes, the coating was sintered in an electric oven at 360° C. for 90 minutes to form a flat coating film having a thickness of 300 μm on the iron plate. By repeating the same procedures twice, a coating film having no pin hole and a thickenss of 800 μm was obtained without generation of crack.

COMPARATIVE EXAMPLE 4

The same PFA powder as used in Example 2 was mixed with the stabilizer with a Henschel mixer in the same manner as in Example 2. 400 Grams of the stabilizer-containing PFA and 240 g of methanol, 240 g of n-butanol and 0.8 g of propylene glycol-propyleneoxide copolymer surfactant mixed, and dispersed uniformly with stirring with a three-one motor. By using the obtained aqueous dispersion composition, the coating, drying and sintering procedures were conducted in the same manner as in Example 2. However, the composition was peeled off from the substrate during the drying because the composition was powdered. In addition, a coating film having a thickness of 200 μm which was formed by the first application had many pin holes. Further, recoating was tried, but the coating resulted in failure due to remarkable peeling off during the drying.

EXAMPLE 3

By using a powder of tetrafluoroethylene-hexafluoropropylene copolymer (FEP) (apparent density 0.5 g/cc, average particle size 48 μm), 100 parts of the powder was mixed with 2 parts of a stabilizer (mixture of 4,4'-bisdiphenylamine/zinc salt of 2-mercaptbenzothiazol/tin powder (not more than 40 μm)=3/3/2 by weight) with a Henschel mixer. 450 Grams of the stabilizer-containing powder was dispersed in a mixture of 50 g of isopropyl alcohol and 245 g of ethylene glycol.

Separately, 10 g of a fluorine surfactant of perfluoroalkylethyleneoxide adduct was added to 245 g of pure water, and stirred to prepare a uniform aqueous dispersion. The aqueous solution of the surfactant and the FEP dispersion were mixed, and the solid was dispersed uniformly by stirring for 15 minutes with a three-one motor to prepare the aqueous dispersion composition of the present invention. An iron plate (SS-41) of 100×80×1 mm was subjected to degreasing with acetone and sand blasting, and thereon a primer layer was formed by applying a primer (Polyfuron enamel EK 1083GB available from Daikin Industries, Ltd.), drying and sintering. On the primer layer, the dispersion composition was applied, and after heating with an IR lamp at 90° C. for 30 minutes, the coating film was sintered in an electric oven at 340° C. for 60 minutes to form a flat coating film having a thickness of 300 µm. By repeating the same procedures twice, a flat coating film having no pin hole and a thickness of 750 µm was obtained without generation of crack during the coating procedures.

COMPARATIVE EXAMPLE 5

Under the same conditions as in Example 3 the application and drying procedures were repeated by using FEP aqueous dispersion (average particle size 0.2 µm, concentration 50% by weight) prepared by emulsion polymerization, and then the sintering was carried out in an electric oven at 380° C. for 40 minutes. A flat coating film having a thickness of 40 µm which was formed by the first coating was obtained. When the recoating was carried out, a coating film having a thickness of more than 100 µm was foamed, and further coating could not be done.

EXAMPLES 4 to 8

The same stabilizer-containing ETFE powder as used in Example 1 was used. Only in Example 5, the glass fibers were mixed with ETFE with a Henschel mixer in the same manner as in Example 1. Separately, the surfactant, ethylene glycol and the optional additives were added to pure water, and stirred for 10 minutes to obtain a uniform aqueous dispersion. Consequently, the ETFE was added to the aqueous dispersion, and dispersed uniformly by stirring for 15 minutes with a three-one motor to obtain the aqueous dispersion composition of the present invention.

With respect to the aqueous dispersion composition, the applying, drying and sintering procedures were carried out in the same manner as in Example 2. Further, the recoating procedures were repeated until observing the generation of pin hole, crack, peeling off and dropping.

EXAMPLE 9

The same stabilizer-containing PFA powder as used in Example 2 was used. A carbon (Carbon Neospectramark II available from Columbia Carbon Co., Ltd.) and the PFA were mixed with a Henschel mixer. Separately, the surfactant, ethylene glycol and IPA were added to pure water and stirred for 10 minutes to prepare a uniform aqueous dispersion. To the aqueous dispersion the PFA was added, and dispersed uniformly by stirring for 15 minutes with a three-one motor to obtain the aqueous dispersion composition of the present invention.

With respect to the aqueous dispersion composition, the applying, drying and sintering procedures were carried out in the same manner as in Example 2. Further, the recoating procedures were repeated until observing the generation of pin hole, crack, peeling off and dropping.

EXAMPLE 10

The same stabilizer-containing FEP powder as used in Example 3 was used. Separately, the surfactant, ethylene glycol, IPA and the optional additives were added to pure water and stirred for 10 minutes to prepare a uniform aqueous dispersion. To the aqueous dispersion the FEP was added, and dispersed uniformly by stirring for 15 minutes with a three-one motor to obtain the aqueous dispersion composition of the present invention.

With respect to the aqueous dispersion composition, the applying, drying and sintering procedures were carried out in the same manner as in Example 3. Further, the recoating procedures were repeated until observing the generation of pin hole, crack, peeling off and dropping.

EXAMPLE 11

By using ETFE powder (apparent density 0.7 g/cc, average particle size 300 µm), 100 parts of the powder and 1 part of a stabilizer (mixture of 4,4'-bisdiphenylamine/zinc salt of 2-mercaptbenzothiazol/tin powder (not more than 40 µm)= 3/3/2 by weight) were mixed with a Henschel mixer. Separately, the surfactant and ethylene glycol were added to pure water and stirred for 10 minutes to prepare a uniform aqueous dispersion. To the aqueous dispersion the ETFE was added, and dispersed uniformly by stirring for 15 minutes with a three-one motor to obtain the aqueous dispersion composition of the present invention. With respect to the aqueous dispersion composition, the applying, drying, and sintering procedures were carried out in the same manner as in Example 1. Further, the recoating procedures were repeated until observing the generation of pin hole, crack, peeling off and dropping.

EXAMPLE 12

By using ETFE powder (apparent density 0.9 g/cc, average particle size 700 µm), 100 parts of the powder and 1 part of a stabilizer (mixture of 4,4'-bisdiphenylamine/zinc salt of 2-mercaptbenzothiazol/tin powder (not more than 40 µm)= 3/3/2 by weight) were mixed with a Henschel mixer. Separately, the surfactant and ethylene glycol were added to pure water and stirred for 10 minutes to prepare a uniform aqueous dispersion. To the aqueous dispersion the ETFE was added, and dispersed uniformly by stirring for 15 minutes with a three-one motor to obtain the aqueous dispersion composition of the present invention. With respect to the aqueous dispersion composition, the applying, drying and sintering procedures were carried out in the same manner as in Example 1. Further, the recoating procedures were repeated until observing the generation of pin hole, crack, peeling off and dropping.

EXAMPLES 13 to 15

The procedures of the mixing, dispersing, applying, drying and sintering were repeated in the same manner as in Example 4 excepting employing 1,4-butandiol, triethylene glycol or tetraethylene glycol instead of ethylene glycol. The obtained coating film was evaluated in the same manner as in the Example.

COMPARATIVE EXAMPLE 6

By using ETFE powder (apparent density 0.2 gl/cc, average particle size 10 µm), 100 parts of the powder and 1 part of a stabilizer (mixture of 4,4'-bisdiphenylamine/zinc salt of 2-mercaptbenzothiazol/tin powder (not more than 40 µm)=3/3/2 by weight) were mixed with a Henschel mixer. Separately, the surfactant and ethylene glycol were added to pure water and stirred for 10 minutes to prepare a uniform aqueous dispersion. To the aqueous dispersion the ETFE was added, and dispersed uniformly by stirring for 15 minutes with a three-one motor to obtain the aqueous dispersion composition of the present invention. With respect to the aqueous dispersion composition, the applying, drying and sintering procedures were carried out in the same manner as in Example 1. Further, the recoating procedures were repeated until observing the generation of pin hole, crack, peeling off and dropping.

The components and amounts of the additives and the test results are shown in Tables 1 to 5. Sum of the weights is 1000 g. The all addition amounts are represented by % by weight. The state of each coating is evaluated on the basis of the coating having a thickness of about 150 μm prepared by electrostatically powder-coating the stabilizer-containing ETFE used in Example 1 in the same manner as in Comparative Example 1, and evaluated as follows: Same ○, little bad Δ, and remarkably bad X. The applicability is evaluated as follows: When evenly coated without plugging the spray gun, represented by ○, and when the spray gun plugs or causes foaming due to early precipitation and surface of the coating becomes rough (nest), according to the degree, represented by Δ and X. Considering the above results, total evaluation is represented by ○, Δ and X. In the Tables, an average thickness per one application and a total thickness are also shown.

TABLE 1

| | | Composition | | | | | |
|---|---|---|---|---|---|---|---|
| | | Resin | | | Water-soluble solvent | | Surfactant |
| | Kind | Particle size (μm) | Apparent density (g/cc) | Amount (wt %) | Kind | Amount (wt %) | Kind | Amount (wt %) |
| Ex. 1 | ETFE | 50 | 0.5 | 52.7 | Ethylene glycol | 7.1 | Fluorine surfactant of perfluoroalkylethyleneoxide adduct | 0.6 |
| Ex. 2 | PFA | 50 | 0.45 | 45 | Ethylene IPA | 24.6 5.0 | Fluorine surfactant of perfluoroalkylethyleneoxide adduct | 0.8 |
| Ex. 3 | FEP | 48 | 0.5 | 45 | Ethylene IPA | 24.5 5.0 | Fluorine surfactant of perfluoroalkylethyleneoxide adduct | 1.0 |
| Ex. 4 | ETFE | 50 | 0.5 | 45 | Ethylene glycol | 22 | Fluorine surfactant of perfluoroalkylethyleneoxide adduct | 0.4 |
| Ex. 5 | ETFE | 50 | 0.5 | 36 | Ethylene glycol | 22 | Fluorine surfactant of perfluoroalkylethyleneoxide adduct | 0.4 |
| Ex. 6 | ETFE | 50 | 0.5 | 45 | Ethylene glycol | 21.7 | Fluorine surfactant of perfluoroalkylethyleneoxide adduct | 0.4 |
| Ex. 7 | ETFE | 50 | 0.5 | 45 | Ethylene glycol | 21 | Fluorine surfactant of perfluoroalkylethyleneoxide adduct | 0.4 |
| Ex. 8 | ETFE | 50 | 0.5 | 45 | Ethylene glycol | 21.6 | Polyoxyethylene alkyl ether | 0.8 |
| Ex. 9 | PFA | 50 | 0.45 | 44.95 | Ethylene IPA | 24.6 5 | Fluorine surfactant of perfluoroalkylethyleneoxide adduct | 0.8 |

| | Composition | | |
|---|---|---|---|
| | Water | Optional additives | |
| | Amount (wt %) | Kind | Amount (wt %) |
| Ex. 1 | 25.9 | Glass fibers (Diameter: 10 μm, Length: 50 μm) | 13.2 |
| | | 3% aqueous solution of methyl cellulose thickener | 0.5 |
| Ex. 2 | 24.6 | — | — |
| Ex. 3 | 24.5 | — | — |
| Ex. 4 | 32.6 | — | — |
| Ex. 5 | 32.6 | Glass fibers (Diameter: 10 μm, Length: 50 μm) | 9 |
| | | 3% aqueous solution of methyl cellulose thickener | 0.5 |
| Ex. 6 | 32.6 | Nickel acetate | 0.3 |
| | | 3% aqueous solution of methyl cellulose thickener | 0.5 |
| Ex. 7 | 32.6 | Poly(alkylene glycol) | 1 |
| | | 3% aqueous solution of methyl cellulose thickener | 0.5 |
| Ex. 8 | 32.6 | 3% aqueous solution of methyl cellulose thickener | 0.5 |
| Ex. 9 | | Carbon | 0.05 |

TABLE 2

| | | Composition | | | | | |
|---|---|---|---|---|---|---|---|
| | | Resin | | | Water-soluble solvent | | Surfactant |
| | Kind | Particle size (μm) | Apparent density (g/cc) | Amount (wt %) | Kind | Amount (wt %) | Kind | Amount (wt %) |
| Ex. 10 | FEP | 48 | 0.5 | 45 | Ethylene glycol IPA | 24.3 5 | Fluorine surfactant of perfluoroalkylethyleneoxide adduct | 1.0 |

TABLE 2-continued

| | | | | | | | | |
|---|---|---|---|---|---|---|---|---|
| Ex. 11 | ETFE | 300 | 0.7 | 66.7 | Ethylene glycol | 13.0 | Fluorine surfactant of perfluoroalkylethyleneoxide adduct | 0.7 |
| Ex. 12 | ETFE | 700 | 0.9 | 66.7 | Ethylene glycol | 13.0 | Fluorine surfactant of perfluoroalkylethyleneoxide adduct | 0.7 |
| Ex. 13 | ETFE | 50 | 0.5 | 45 | 1,4-Butandiol | 22 | Fluorine surfactant of perfluoroalkylethyleneoxide adduct | 0.4 |
| Ex. 14 | ETFE | 50 | 0.5 | 45 | Triethylene glycol | 22 | Fluorine surfactant of perfluoroalkylethyleneoxide adduct | 0.4 |
| Ex. 15 | ETFE | 50 | 0.5 | 45 | Tetraethylene glycol | 22 | Fluorine surfactant of perfluoroalkylethyleneoxide adduct | 0.4 |

| | Composition | | |
|---|---|---|---|
| | Water | Optional additives | |
| | Amount (wt %) | Kind | Amount (wt %) |
| Ex. 10 | 24.3 | Nickel nitrate 1% aq | 0.4 |
| Ex. 11 | 19.6 | — | — |
| Ex. 12 | 19.6 | — | — |
| Ex. 13 | 32.6 | — | — |
| Ex. 14 | 32.6 | — | — |
| Ex. 15 | 32.6 | — | — |

TABLE 3

| | Composition | | | | | | | |
|---|---|---|---|---|---|---|---|---|
| | Resin | | | Water-soluble solvent | | Surfactant | | |
| Kind | Particle size (μm) | Apparent density (g/cc) | Amount (wt %) | Kind | Amount (wt %) | Kind | Amount (wt %) | |
| Com. Ex. 1 ETFE | 50 | 0.5 | 80 | — | — | — | — | |
| Com. Ex. 2 ETFE | 50 | 0.5 | 52.7 | — | — | Fluorine surfactant of perfluoroalkylethyleneoxide adduct | 0.6 | |
| Com. Ex. 3 ETFE | 3–7 | 0.4 | 52.7 | Ethylene glycol | 7.1 | Fluorine surfactant of perfluoroalkylethyleneoxide adduct | 0.6 | |
| Com. Ex. 4 PFA | 50 | 0.45 | 45.5 | Methanol n-Butanol | 27.2 27.2 | Propylene glycol-propyleneoxide copolymer surfactant | 0.1 | |
| Com. Ex. 5 FEP | 0.2 | — | 50 | — | — | — | — | |
| Com. Ex. 6 ETFE | 10 | 0.2 | 66.7 | Ethylene glycol | 13.0 | Fluorine surfactant of perfluoroalkylethyleneoxide adduct | 0.7 | |

| | Composition | | |
|---|---|---|---|
| | Water | Optional additives | |
| | Amount (wt %) | Kind | Amount (wt %) |
| Com. Ex. 1 | — | Glass fibers (Diameter: 10 μm, Length: 50 μm) | 20 |
| Com. Ex. 2 | 33.0 | Glass fibers (Diameter: 10 μm, Length: 50 μm) 3% aqueous solution of methyl cellulose thickener | 13.2 0.5 |
| Com. Ex. 3 | 25.9 | Glass fibers (Diameter: 10 μm, Length: 50 μm) 3% aqueous solution of methyl cellulose thickener | 13.2 0.5 |
| Com. Ex. 4 | — | — | — |
| Com. Ex. 5 | 50 | — | — |
| Com. Ex. 6 | 19.6 | — | — |

TABLE 4

| | Sintering condition | Total | Applicability | Crack | Pin hole | Coloring | Thickness per one (μm) | Total thickness (μm/times) |
|---|---|---|---|---|---|---|---|---|
| Ex. 1 | 300° C. × 60 min. | ○ | ○ | ○ | ○ | Δ | 750 | 1500/2 |
| Ex. 2 | 360° C. × 90 min. | ○ | ○ | ○ | ○ | Δ | 267 | 800/3 |
| Ex. 3 | 340° C. × 60 min. | ○ | ○ | ○ | ○ | Δ | 250 | 750/3 |
| Ex. 4 | 300° C. × 60 min. | ○ | ○ | ○ | ○ | Δ | 400 | 2000/5 |
| Ex. 5 | 300° C. × 60 min. | ○ | ○ | ○ | ○ | Δ | 500 | 3000/6 |
| Ex. 6 | 300° C. × 60 min. | ○ | ○ | ○ | Δ | X | 500 | 3000/6 |
| Ex. 7 | 300° C. × 60 min. | Δ | ○ | Δ | Δ | X | 400 | 2000/5 |
| Ex. 8 | 300° C. × 60 min. | Δ | ○ | Δ | Δ | Δ | 350 | 1750/5 |
| Ex. 9 | 360° C. × 60 min. | ○ | ○ | ○ | ○ | Δ | 300 | 1500/5 |

TABLE 5

| | Sintering condition | Total | Applicability | Crack | Pin hole | Coloring | Thickness per one (μm) | Total thickness (μm/times) |
|---|---|---|---|---|---|---|---|---|
| Ex. 10 | 340° C. × 60 min. | ○ | ○ | ○ | Δ | X | 300 | 1500/5 |
| Ex. 11 | 300° C. × 60 min. | ○ | ○ | ○ | ○ | Δ | 500 | 3000/6 |
| Ex. 12 | 300° C. × 60 min. | Δ | Δ | ○ | Δ | Δ | 300 | 1500/5 |
| Ex. 13 | 300° C. × 60 min. | ○ | ○ | ○ | ○ | Δ | 500 | 3000/6 |
| Ex. 14 | 300° C. × 60 min. | ○ | ○ | ○ | ○ | ○ | 460 | 2300/5 |
| Ex. 15 | 300° C. × 60 min. | Δ | Δ | ○ | ○ | Δ | 333 | 2000/6 |
| Com. Ex. 1 | 300° C. × 60 min. | Δ | — | ○ | ○ | ○ | 150 | 900/6 |
| Com. Ex. 2 | 300° C. × 60 min. | X | ○ | Δ | Δ | Δ | 500 | 500/1 |
| Com. Ex. 3 | 300° C. × 60 min. | X | X | X | Δ | Δ | 300 | 300/1 |
| Com. Ex. 4 | 360° C. × 90 min. | X | X | X | Δ | Δ | 200 | 200/1 |
| Com. Ex. 5 | 380° C. × 40 min. | Δ | ○ | X | ○ | ○ | 40 | 80/2 |
| Com. Ex. 6 | 300° C. × 60 min. | X | X | X | X | Δ | 100 | 100/1 |

According to the aqueous dispersion composition of the fluorine-containing melt-processable resin of the present invention, a thickness per one application can be considerably increased without crack, whereby the number of applying steps and the sintering steps can be reduced, and further a thicker coating film which has never been produced can be formed, and the generation of pin holes can be inhibited. Also, the working can be done safely, because the composition is aqueous.

INDUSTRIAL APPLICABILITY

The composition of the present invention is useful as aqueous paints for thick layer coatings, and the like. As the aqueous paints, by varying the concentration of the fluorine-containing melt-processable resin powder, there are used for the spray coating, dipping, casting, putty coating (brush, roller, knife and the like), and also electrodepositing.

We claim:

1. A method of coating a substrate comprising the steps of
(a) coating the substrate with the aqueous dispersion composition comprising a fluorine-containing melt-processable resin powder having an average particle size of 10 to 300 μm, a water-soluble solvent in an amount of 0.5 to 50 wt % based on total amount of water, a surfactant in an amount of 0.01 to 10 wt % of the fluorine-containing melt-processable resin powder, and balance water, the fluorine-containing melt-processable resin powder being contained in an amount of 15 to 80% by weight of the composition and having an apparent density of 0.3 to 1.5 g/cc: the water-soluble solvent is a member selected from the group consisting of methanol, ethanol, isopropanol, toluene, ethylene glycol, 1,4-butandiol, triethylene glycol and tetraethylene glycol; and the surfactant is a member selected from the group consisting of sodium alkylsulfate, polvoxyethylene alkyl ether, poly(ethyleneglycol alkyphenyl ether), propylene glycol-propyleneoxide copolymer and perfluoralkyl ethyleneoxide adduct,
(b) heating and sintering a resultant coated substrate, and
(c) repeating steps (a) and (b) at least once where the substrate, previously coated with the aqueous dispersion and then heated and sintered, is again coated with the aqueous dispersion, and heated and sintered.

2. The process of claim 1 wherein step (c) results in a coating having a thickness of about 250 μm to about 1200 μm.

3. The process of claim 1, wherein step (b) results in a coating having a thickness of about 250 μm to about 1200 μm.

4. An aqueous dispersion composition comprising a fluorine-containing melt-processable resin powder having an average particle size of 10 to 300 μm, a water-soluble solvent in an amount of 0.5 to 50 wt % based on total amount of water, a surfactant in an amount of 0.01 to 10 wt % of the fluorine-containing melt-processable resin powder, and balance water, the fluorine-containing melt-processable resin powder being contained in an amount of 15 to 80% by weight of the composition,
wherein the fluorine-containing melt-processable resin powder has an apparent density of 0.3 to 1.5 g/cc and the water-soluble solvent is a member selected from the group consisting of methanol, ethanol, isopropanol, toluene, ethylene glycol, 1,4-butandiol, triethylene glycol and tetraethylene glycol; and the surfactant is a member selected from the group consisting of sodium alkylsulfate, polyoxyethylene alkyl ether, poly (ethyleneglycol alkyphenyl ether), propylene glycol-propyleneoxide copolymer and perfluoralkyl ethyleneoxide adduct.

5. The compositions of claim 4, wherein the water-soluble solvent is an alcohol solvent.

6. The composition of claim 4, wherein the average particle size of the fluorine-containing melt-processable resin powder is 30 to 300 $\mu$m.

7. The composition of claim 4, which contains no binder.

* * * * *